(12) United States Patent
Lewis et al.

(10) Patent No.: US 6,396,461 B1
(45) Date of Patent: *May 28, 2002

(54) PERSONAL DISPLAY WITH VISION TRACKING

(75) Inventors: John R. Lewis, Bellevue; Nenad Nestorovic, Seattle, both of WA (US)

(73) Assignee: Microvision, Inc., Bothell, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,954

(22) Filed: Aug. 5, 1998

(51) Int. Cl.[7] .................................................. G09G 5/00
(52) U.S. Cl. ................................................ 345/7; 345/8
(58) Field of Search ............................................ 345/7–9

(56) References Cited

U.S. PATENT DOCUMENTS

| | | | |
|---|---|---|---|
| 5,355,181 A | | 10/1994 | Ashizake et al. |
| 5,467,104 A | | 11/1995 | Furness, III et al. |
| 5,539,422 A | | 7/1996 | Heacock et al. |
| 5,557,444 A | | 9/1996 | Melville et al. |
| 5,574,473 A | * | 11/1996 | Sekiguchi ........................ 345/8 |
| 5,596,339 A | | 1/1997 | Furness et al. |
| 5,635,947 A | * | 6/1997 | Iwamoto ........................ 345/7 |
| 5,659,327 A | | 8/1997 | Furness, III et al. |
| 5,659,430 A | | 8/1997 | Togino |
| 5,701,132 A | | 12/1997 | Kollin et al. |
| 5,727,098 A | | 3/1998 | Jacobson |
| 5,751,259 A | * | 5/1998 | Iwamoto ........................ 345/7 |
| 5,751,465 A | | 5/1998 | Melville et al. |
| 5,903,397 A | * | 5/1999 | Melville et al. ............. 359/630 |
| 6,008,781 A | * | 12/1999 | Furness, III et al. ............ 345/7 |
| 6,204,829 B1 | * | 3/2001 | Tidwell ........................ 345/7 |

FOREIGN PATENT DOCUMENTS

| | | |
|---|---|---|
| WO | WO 98/44927 | 11/1998 |
| WO | WO 99/36903 | 7/1999 |

OTHER PUBLICATIONS

Eye Control Technologies, Inc., Catalog, 1998, Corvallis, Oregon, USA.

* cited by examiner

Primary Examiner—Richard Hjerpe
Assistant Examiner—Duc Q. Dinh

(57) ABSTRACT

A display apparatus includes an image source, an eye position detector, and a combiner, that are aligned to a user's eye. The eye position detector monitors light reflected from the user's eye to identify the pupil position. If light from the image source becomes misaligned with respect to the pupil, a physical positioning mechanism adjusts the relative positions of the image source and the beam combiner so that light from the image source is translated relative to the pupil, thereby realigning the display to the pupil. In one embodiment, the positioner is a piezoelectric positioner and in other embodiments, the positioner is a servomechanism or a shape memory alloy.

10 Claims, 13 Drawing Sheets

PERSONAL DISPLAY WITH VISION TRACKING

TECHNICAL FIELD

The present invention relates to displays and, more particularly, to displays that produce images responsive to a viewer's eye orientation.

BACKGROUND OF THE INVENTION

A variety of techniques are available for providing visual displays of graphical or video images to a user. For example, cathode ray tube type displays (CRTs), such as televisions and computer monitors are very common. Such devices suffer from several limitations. For example, CRTs are bulky and consume substantial amounts of power, making them undesirable for portable or head-mounted applications.

Flat panel displays, such as liquid crystal displays and field emission displays, may be less bulky and consume less power. However, typical flat panel displays utilize screens that are several inches across. Such screens have limited use in head mounted applications or in applications where the display is intended to occupy only a small portion of a user's field of view.

More recently, very small displays have been developed for partial or augmented view applications. In such applications, a portion of the display is positioned in the user's field of view and presents an image that occupies a region 42 of the user's field of view 44, as shown in FIG. 1. The user can thus see both a displayed image 46 and background information 48.

One difficulty with such displays is that, as the user's eye moves to view various regions of the background information, the user's field of view shifts. As the field of view shifts, the position of the region 42 changes relative to the field of view 44. This shifting may be desirable where the region 42 is intended to be fixed relative to the background information 48. However, this shifting can be undesirable in applications where the image is intended to be at a fixed location in the user's field of view. Even if the image is intended to move within the field of view, the optics of the displaying apparatus may not provide an adequate image at all locations or orientations of the user's pupil relative to the optics.

One example of a small display is a scanned display such as that described in U.S. Pat. No. 5,467,104 of Furness et. al., entitled VIRTUAL RETINAL DISPLAY, which is incorporated herein by reference. In scanned displays, a scanner, such as a scanning mirror or acousto-optic scanner, scans a modulated light beam onto a viewer's retina. The scanned light enters the eye through the viewer's pupil and is imaged onto the retina by the cornea and eye lens. As will now be described with reference to FIG. 2, such displays may have difficulty when the viewer's eye moves.

As shown in FIG. 2, a scanned display 50 is positioned for viewing by a viewer's eye 52. The display 50 includes four principal portions, each of which will be described in greater detail below. First, control electronics 54 provide electrical signals that control operation of the display 50 in response to an image signal $V_{IM}$ from an image source 56, such as a computer, television receiver, videocassette player, or similar device.

The second portion of the display 50 is a light source 57 that outputs a modulated light beam 53 having a modulation corresponding to information in the image signal $V_{IM}$. The light source may be a directly modulated light emitter such as a light emitting diode (LED) or may be include a continuous light emitter indirectly modulated by an external modulator, such as an acousto-optic modulator.

The third portion of the display 50 is a scanning assembly 58 that scans the modulated beam 53 of the light source 57 through a two-dimensional scanning pattern, such as a raster pattern. One example of such a scanning assembly is a mechanically resonant scanner, such as that described U.S. Pat. No. 5,557,444 to Melville et al., entitled MINIATURE OPTICAL SCANNER FOR A TWO-AXIS SCANNING SYSTEM, which is incorporated herein by reference. However, other scanning assemblies, such as acousto-optic scanners may be used in such displays.

Optics 60 form the fourth portion of the display 50. The imaging optics 60 in the embodiment of FIG. 2 include a pair of lenses 62 and 64 that shape and focus the scanned beam 53 appropriately for viewing by the eye 52. The scanned beam 53 enters the eye 52 through a pupil 65 and strikes the retina 59. When scanned modulated light strikes the retina 59, the viewer perceives the image.

As shown in FIG. 3, the display 50 may have difficulty when the viewer looks off-axis. When the viewer's eye 52 rotates, the viewer's pupil 65 moves from its central position. In the rotated position all or a portion of the scanned beam 53 from the imaging optics 56 may not enter the pupil 65. Consequently, the viewer's retina 59 does not receive all of the scanned light. The viewer thus does not perceive the entire image.

One approach to this problem described employs an optics that expand the cross-sectional area of the scanned effective beam. A portion of the expanded beam strikes the pupil 65 and is visible to the viewer. While such an approach can improve the effective viewing angle and help to ensure that the viewer perceives the scanned image, the intensity of light received by the viewer is reduced as the square of the beam radius.

SUMMARY OF THE INVENTION

A display apparatus tracks the orientation or position of a user's eye and actively adjusts the position or orientation of an image source or manipulates an intermediate component to insure that light enters the user's pupil or to control the perceived location of a virtual image in the user's field of view. In one embodiment, the display includes a beam combiner that receives light from a background and light from the image source. The combined light from the combiner is received through the user's pupil and strikes the retina. The user perceives an image that is a combination of the virtual image and the background.

In addition to the light from the background and light from the image source, additional light strikes the user's eye. The additional light may be a portion of the light provided by the image source or may be provided by a separate light source. The additional light is preferably aligned with light from the beam combiner. Where the additional light comes from a source other than the image source, the additional light is preferably at a wavelength that is not visible.

A portion of the additional light is reflected or scattered by the user's eye and the reflected or scattered portion depends in part upon whether the additional light enters the eye through the pupil or whether the additional light strikes the remaining area of the eye. The reflected or scattered light is then indicative of alignment of the additional light to the user's pupil.

In one embodiment, an image field of a detector is aligned with the light exiting the beam combiner. The detector receives the reflected portion of the additional light and provides an electrical signal indicative of the amount of reflected light to a position controller.

In one embodiment, the detector is a low-resolution CCD array and the position controller includes an electronic controller and a look up table in a memory that provides adjustment data in response to the signals from the detector. Data from the look up table drives a piezoelectric positioning mechanism that is physically coupled to a substrate carrying both the detector and the image source.

When the detector indicates a shift in location of the reflected additional light, the controller accesses the look up table to retrieve positioning data. In response to the retrieved data, the piezoelectric positioning mechanism shifts the substrate to realign the image source and the detector to the pupil.

In another embodiment, the CCD array is replaced by a quadrant-type detector, including a plurality of spaced-apart detectors. The outputs of the detectors drive a control circuit that implements a search function to align the scanned beam to the pupil.

In one embodiment, imaging optics having a magnification greater than one helps to direct light from the image source and additional light to the user's eye. Physical movement of the image source and detector causes an even greater movement of the location at which light from the image source strikes the eye. Thus, small movements induced by the piezoelectric positioning mechanism can track larger movements of the pupil position.

DETAILED DESCRIPTION OF THE INVENTION

Figure 2:
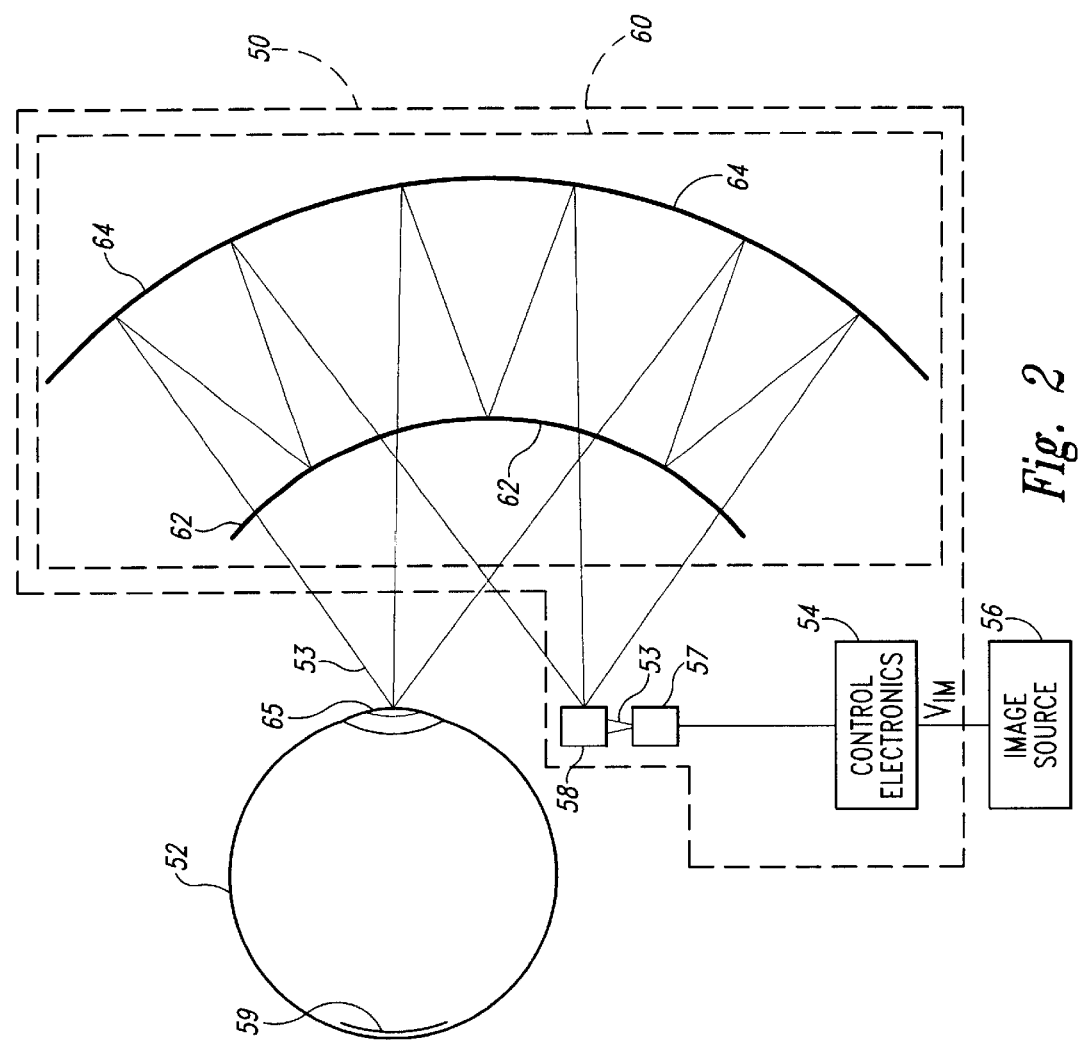
FIG. 2 is a diagrammatic representation of a scanner and a user's eye showing alignment of a scanned beam with the user's pupil.
Figure 3:
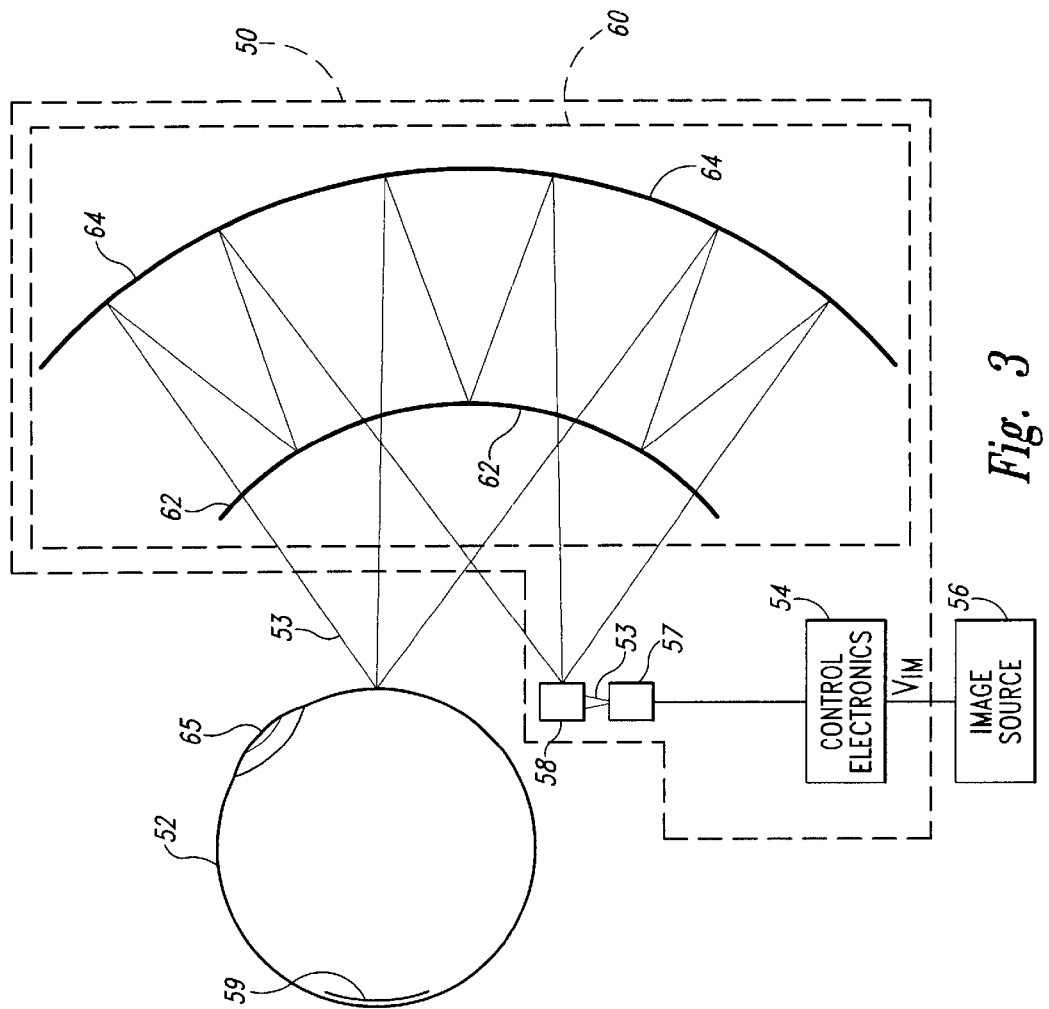
FIG. 3 is a diagrammatic representation of a scanner and a user's eye showing misalignment of the scanned beam with the user's pupil.
Figure 4:
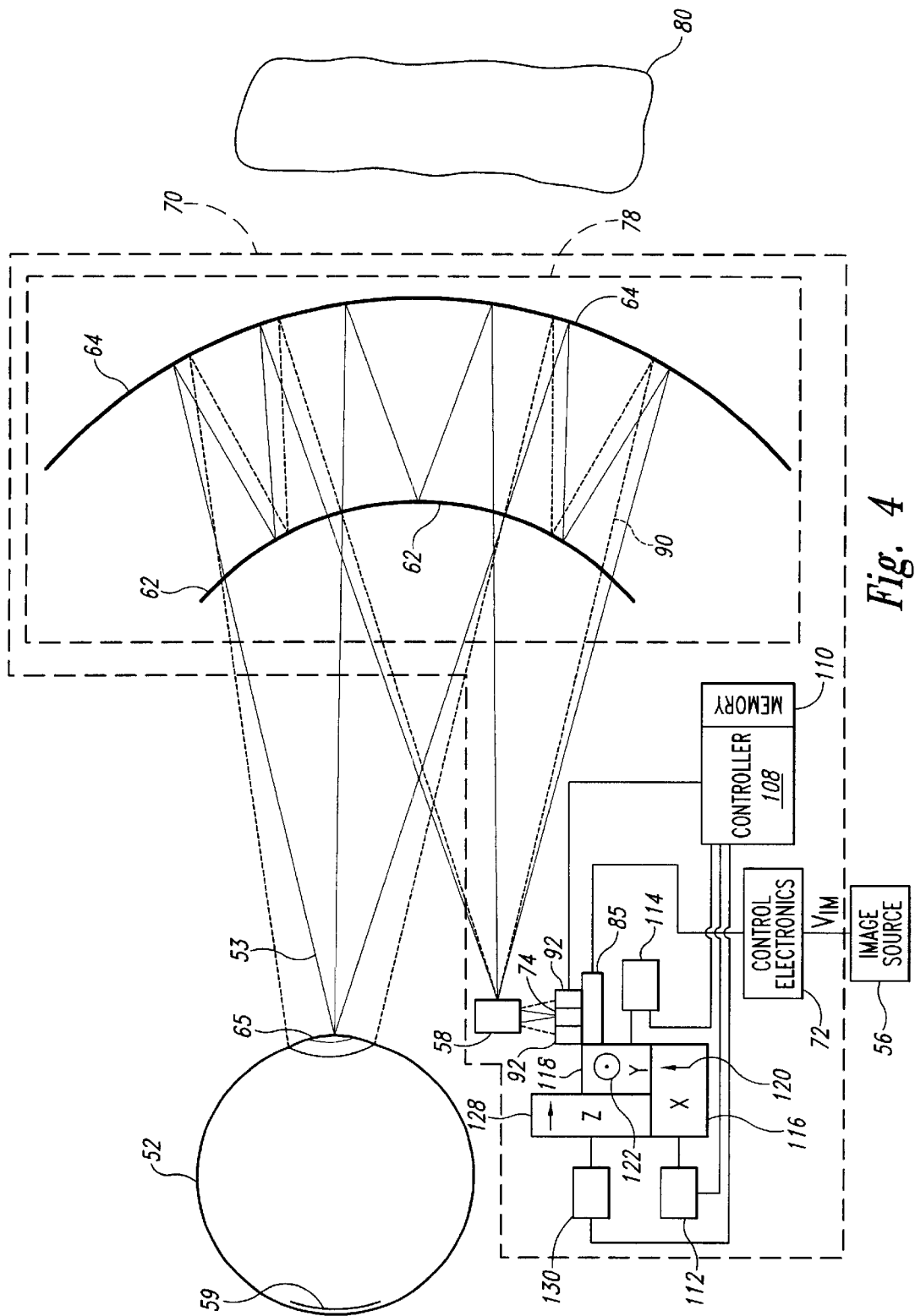
FIG. 4 is a diagrammatic representation of a display according to one embodiment of the invention including a positioning beam and detector.

As shown in FIG. 4, a virtual retinal display 70 according to the invention includes control electronics 72, a light source 74, a scanning assembly 58, and imaging optics 78. As with the embodiment of FIG. 2, the light source may be directly or indirectly modulated and the imaging optics 78 are formed from curved, partially transmissive mirrors 62, 64 that combine light received from a background 80 with light from the scanning assembly 58 to produce a combined input to the viewer's eye 52. The light source 74 emits light modulated according to image signals $V_{IM}$ the image signal source 56, such as a television receiver, computer, CD-ROM player, videocassette player, or any similar device. The light source 74 may utilize coherent light emitters, such as laser diodes or microlasers, or may use noncoherent sources such as light emitting diodes. Also, the light source 74 may be directly modulated or an external modulator, such as an acousto-optic modulator, may be used. One skilled in the art will recognize that a variety of other image sources, such as LCD panels and field emission displays, may also be used. However, such image sources are usually not preferred because they typically are larger and bulkier than the image source described in the preferred embodiment. Their large mass makes them more difficult to reposition quickly as described below with reference to FIGS. 6–8. Moreover, although the background 80 is presented herein as a "real-world" background, the background light may be occluded or may be produced by another light source of the same or different type.

Figure 5:
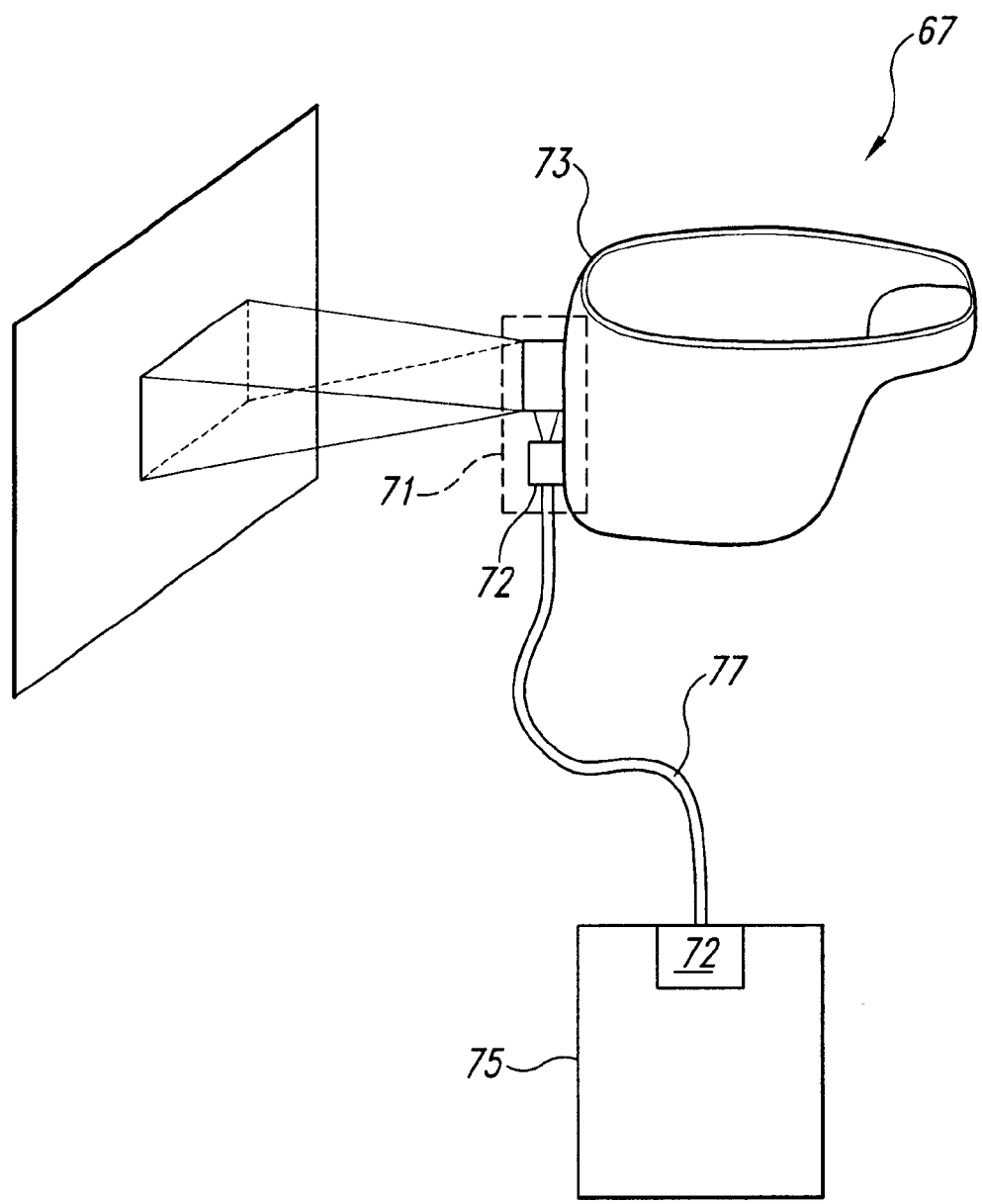
FIG. 5 is an isometric view of a head-mounted scanner including a tether.

Although the elements here are presented diagrammatically, one skilled in the art will recognize that the components are typically sized and configured for mounting to a helmet or similar frame as a head-mounted display 67, as shown in FIG. 5. In this embodiment, a first portion 71 of the display 67 is mounted to a head-borne frame 73 and a second portion 75 is carried separately, for example in a hip belt. The portions 71, 75 are linked by a fiber optic and electronic tether 77 that carries optical and electronic signals from the second portion to the first portion. An example of a fiber coupled scanner display is found in U.S. Pat. No. 5,596,339 of Furness et. al., entitled VIRTUAL RETINAL DISPLAY WITH FIBER OPTIC POINT SOURCE which is incorporated herein by reference. One skilled in the art will recognize that, in many applications, the light source may be coupled directly to the scanning assembly 58 so that the fiber can be eliminated.

Returning to the display 70 of FIG. 4, the user's eye 52 is typically in a substantially fixed location relative to the imaging optics 78 because the display 70 is typically head mounted. For clarity, this description therefore does not discuss head movement in describing operation of the display 70. One skilled in the art will recognize that the display 70 may be used in other than head-mounted applications, such as where the display 70 forms a fixed viewing apparatus having an eyecup against which the user's eye socket is pressed. Also, the user's head may be free for relative movement in some applications. In such applications, a known head tracking system may track the user's head position for coarse positioning.

Figure 1:
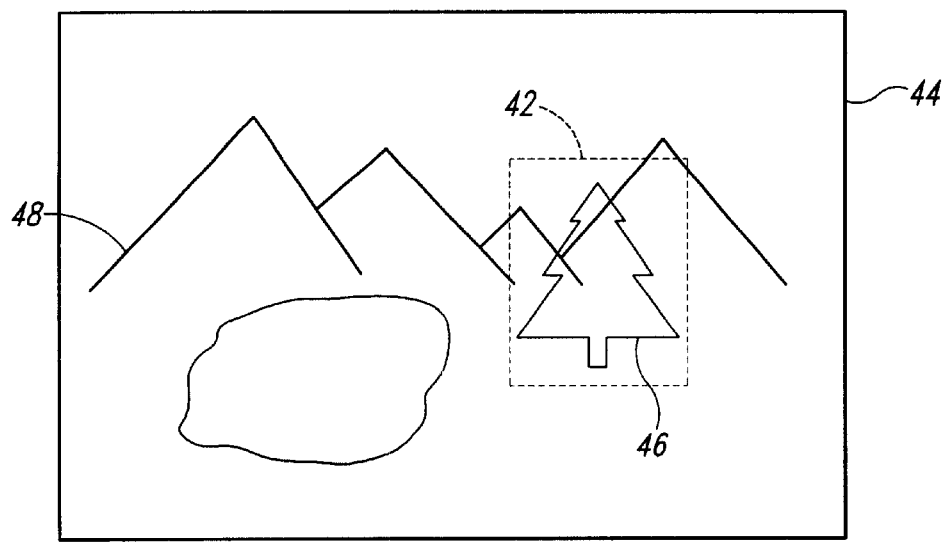
FIG. 1 is a diagrammatic representation of a combined image perceived by a user resulting from the combination of light from an image source and light from a background.

Imaging optics 78 redirect and magnify scanned light from the scanning assembly 58 toward the user's eye 52, where the light passes through the pupil 65 and strikes the retina 59 to produce a virtual image. At the same time, light from the background 80 passes through the mirrors 62, 64 and pupil 65 to the user's retina 59 to produce a "real" image. Because the user's retina 59 receives light from both the scanned beam and the background 80, the user perceives a combined image with the virtual image appearing transparent, as shown in FIG. 1. To ease the user's acquisition of light from partially or fully reflective mirrors 62, 64, the imaging optics 78 may also include an exit pupil expander that increases the effective numerical aperture of the beam of scanned light. The exit pupil expander is omitted from the Figures for clarity of presentation of the beam 53.

In addition to light from the light source 74, the imaging optics 78 also receive a locator beam 90 from an infrared light source 92 carried by a common substrate 85 with the light source 74. Though the locator beam 90 is shown as following a different optical path for clarity of presentation, the infrared light source 92 is actually positioned adjacent to the light source 74 so that light from the light source 74 and light from the infrared light source 92 are substantially collinear. Thus, the output of the imaging optics 78 includes light from the infrared light source 92. One skilled in the art will recognize that, although the infrared light source 92 and the light source 74 are shown as being physically adjacent, other implementations are easily realizable. For example, the infrared light source 92 may be physically separated from the light source 74 by superimposing the locator beam 90 onto the light from the light source 74 with a beam splitter and steering optics.

Figure 6:
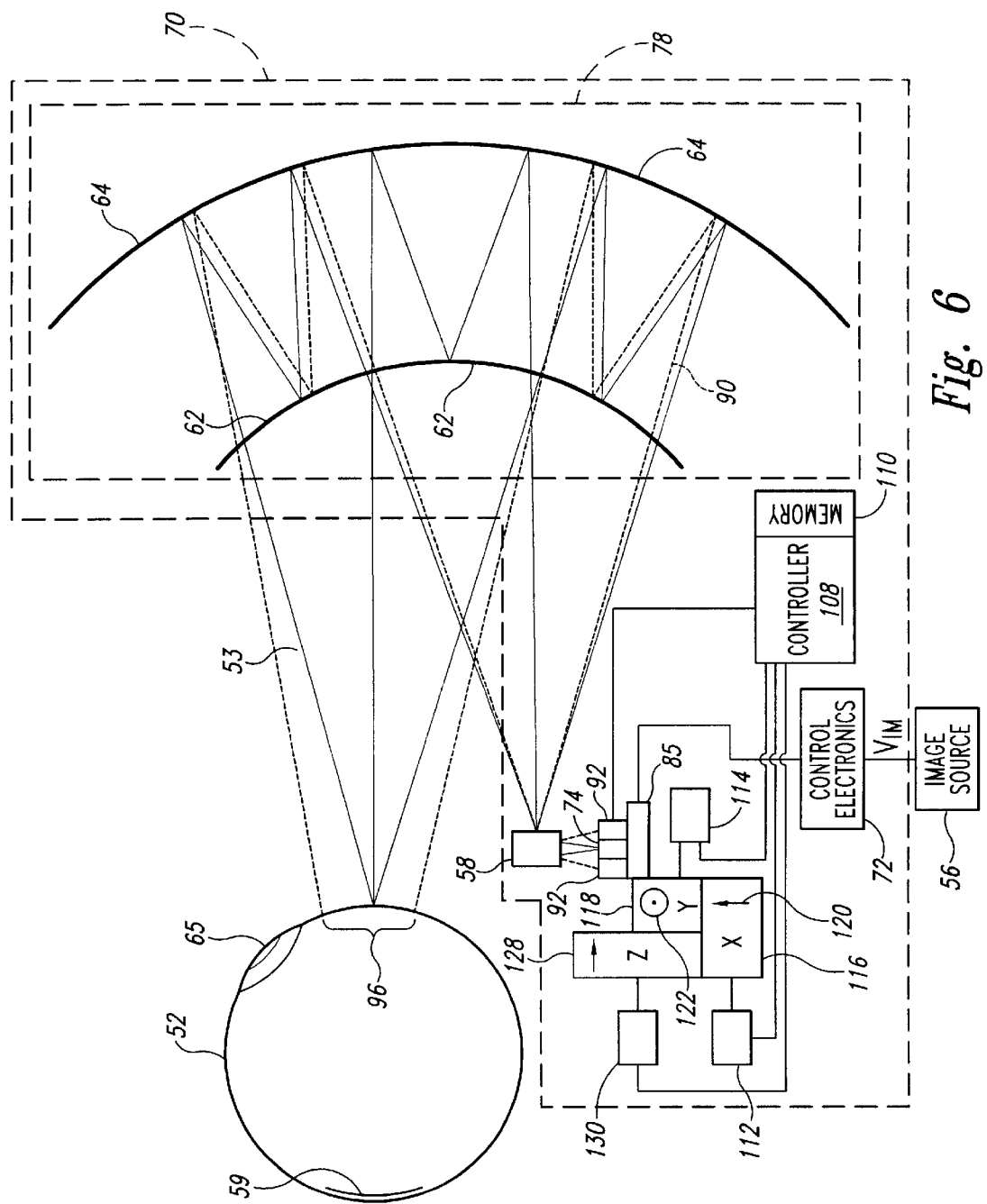
FIG. 6 is a diagrammatic representation of the display of FIG. 4 showing displacement of the eye relative to the beam position and corresponding reflection of the positioning beam.

Tracking of the eye position will now be described with reference to FIGS. 6–9. As shown in FIG. 6, when the user's eye 52 moves, the pupil 65 may become misaligned with light from the light source 74 and infrared light source 92. All or a portion of the light from the light source 74 and infrared source 92 may no longer enter the pupil 65 or may enter the pupil 65 at an orientation where the pupil 65 does not direct the light to the center of the retina 59. Instead, some of the light from the sources 74, 92 strikes a non-pupil portion 96 of the eye. As is known, the non-pupil portion 96 of the eye has a reflectance different and typically higher than that of the pupil 65. Consequently, the non-pupil portion 96 reflects light from the sources 74, 92 back toward the imaging optics 78. The imaging optics 78 redirect the reflected light toward an optical detector 98 positioned on the substrate 85 adjacent to the sources 74, 92. In this embodiment, the detector 98 is a commercially available CCD array that is sensitive to infrared light. As will be described below, in some applications, other types of detectors may be desirable.

Figure 7A:
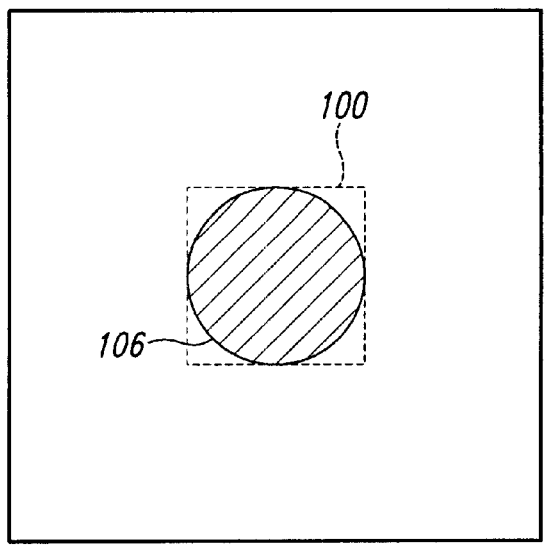
FIG. 7A is a diagrammatic representation of reflected light striking the detector in the position of FIG. 4.
Figure 7B:
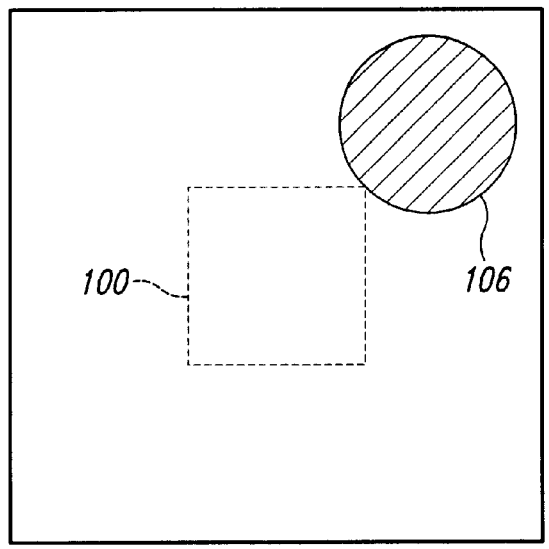
FIG. 7B is a diagrammatic representation of reflected light striking the detector in the position of FIG. 6.

As shown in FIG. 7A, when the user's eye is positioned so that light from the sources 74, 92 enters the pupil (i.e., when the eye is positioned as shown in FIG. 4), a central region 100 of the detector 98 receives a low level of light from the imaging optics 78. The area of low light resulting from the user's pupil will be referred to herein as the pupil shadow 106. When the eye 52 shifts to the position shown in FIG. 6, the pupil shadow shifts relative to the detector 88 as shown in FIG. 7B.

The detector data, which are indicative of the position of the pupil shadow 106 are input to an electronic controller 108, such as a microprocessor or application specific integrated circuit (ASIC). Responsive to the data, the controller 108 accesses a look up table in a memory device 110 to retrieve positioning data indicating an appropriate positioning correction for the light source 74. The positioning data may be determined empirically or may be calculated based upon known geometry of the eye 52 and the scanning assembly 58.

In response to the retrieved positioning data, the controller 110 activates X and Y drivers 112, 114 to provide voltages to respective piezoelectric positioners 116, 118 coupled to the substrate 85. As is known, piezoelectric materials deform in the presence of electrical fields, thereby converting voltages to physical movement. Therefore, the applied voltages from the respective drivers 112, 114 cause the piezoelectric positioners 116, 118 to move the sources 74, 92, as indicated by the arrow 120 and arrowhead 122 in FIG. 8.

Figure 9:
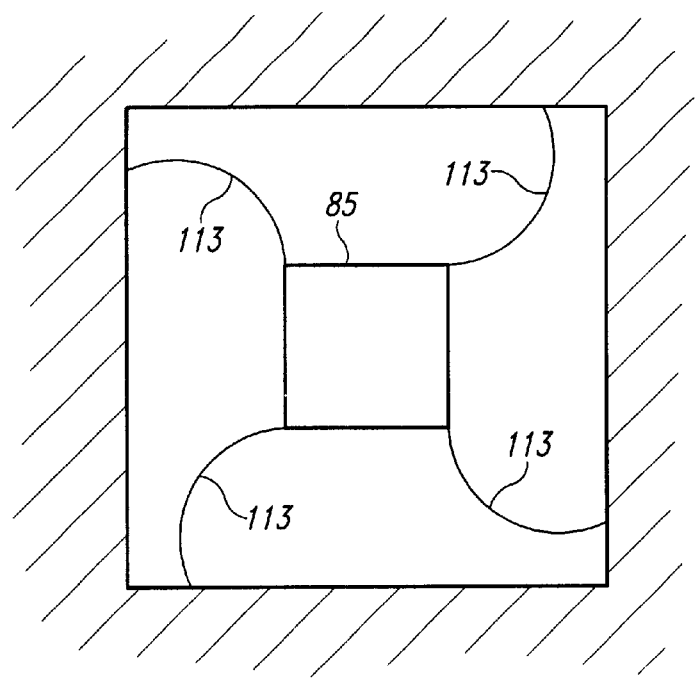
FIG. 9 is a detail view of a portion of a display showing shape memory alloy-based positioners coupled to the substrate.
Figure 8:
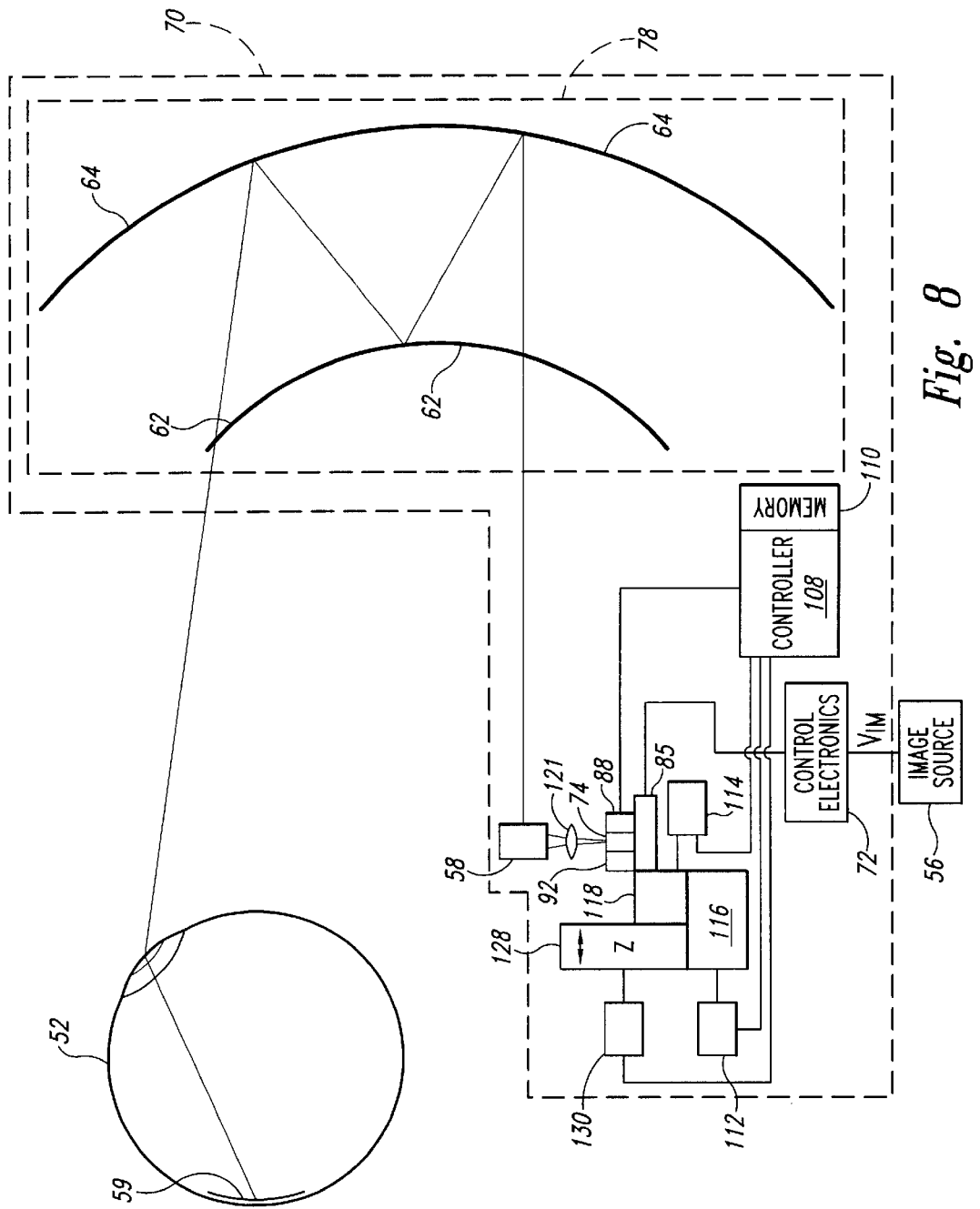
FIG. 8 is a diagrammatic representation of the display of FIG. 2 showing the image source and positioning beam source adjusted to correct the misalignment of FIG. 6.

As shown in FIG. 8, shifting the positions of the sources 74, 92 shifts the locations at which light from the sources 74, 92 strikes the user's eye, so that the light once again enters the pupil. The pupil shadow 106 once again returns to the position shown in FIG. 7A. One skilled in the art will recognize that the deformation of the piezoelectric positioner 116 is exaggerated in FIG. 8 for demonstrative purposes. However, because the mirrors 62, 64 have a magnification greater than one, small shifts in the position of the substrate 85 can produce larger shifts in the location at which the light from the light source 74 arrives at the eye. Thus, the piezoelectric positioners 112, 114 can produce sufficient beam translation for many positions of the eye. Where even larger beam translations are desirable, a variety of other types of positioners, such as electronic servomechanisms may be used in place of the piezoelectric positioners 112, 114. Alternatively, shape memory alloy-based positioners 113, such as equiatomic nickel-titanium alloys, can be used to reposition the substrate as shown in FIG. 9. The positioners 113 may be spirally located, as shown in FIG. 9 or may be in any other appropriate configuration. One skilled in the art will also recognize that the imaging optics 78 does not always require magnification, particularly where the positioners 116, 118 are formed from a mechanism that provides relatively large translation of the scanner 70.

Figure 10:
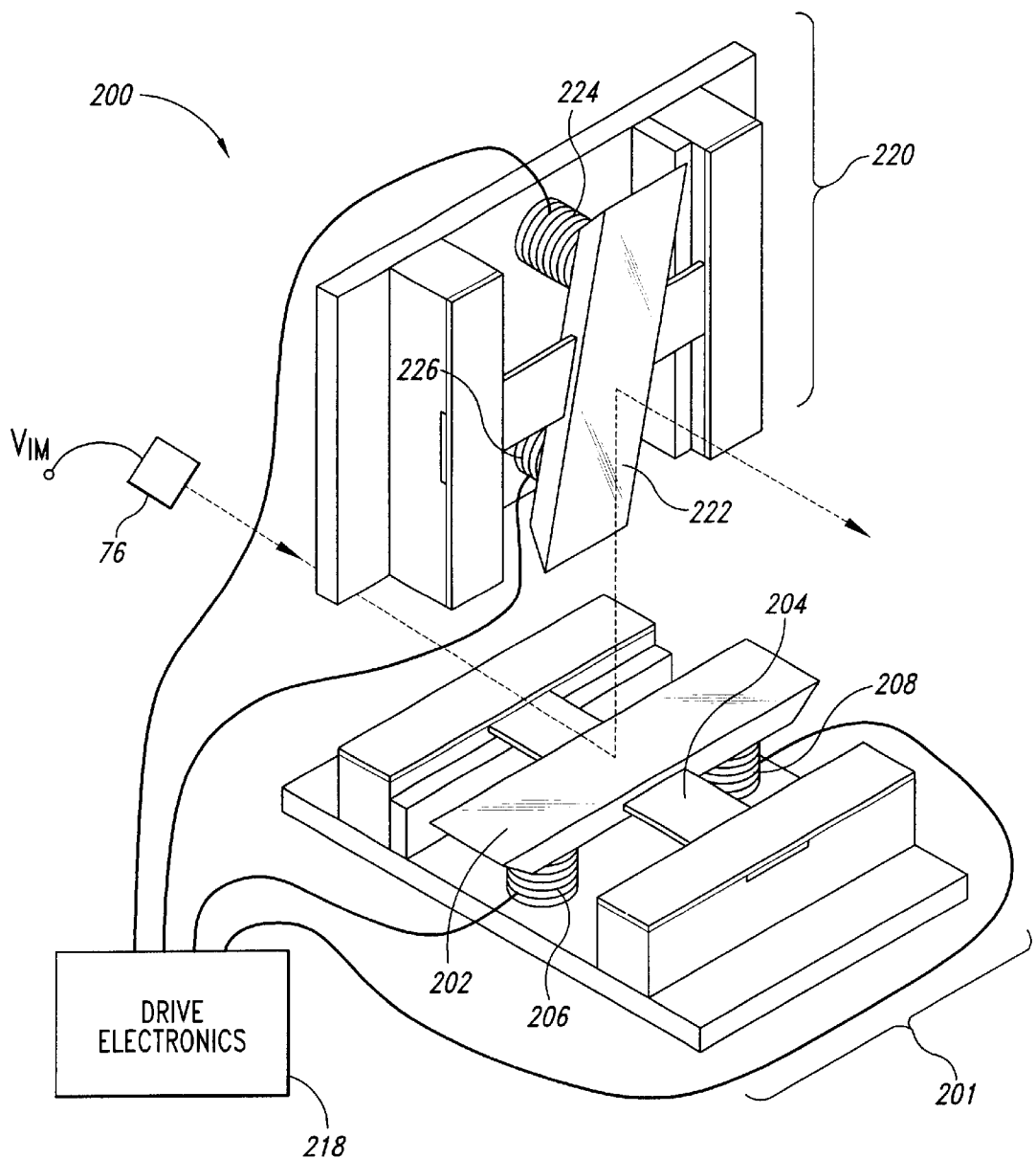
FIG. 10 is a schematic of a scanning system suitable for use as the image source in the display of FIG. 4.

FIG. 10 shows one embodiment of a mechanically resonant scanner 200 suitable for use as the scanning assembly 58. The resonant scanner 200 includes as the principal horizontal scanning element, a horizontal scanner 201 that includes a moving mirror 202 mounted to a spring plate 204. The dimensions of the mirror 202 and spring plate 204 and the material properties of the spring plate 204 are selected so that the mirror 202 and spring plate 204 have a natural oscillatory frequency on the order of 1–100 kHz. A ferromagnetic material mounted with the mirror 202 is driven by a pair of electromagnetic coils 206, 208 to provide motive force to mirror 202, thereby initiating and sustaining oscillation. Drive electronics 218 provide electrical signal to activate the coils 206, 208.

Vertical scanning is provided by a vertical scanner 220 structured very similarly to the horizontal scanner 201. Like the horizontal scanner 201, the vertical scanner 220 includes a mirror 222 driven by a pair of coils 224, 226 in response to electrical signals from the drive electronics 218. However, because the rate of oscillation is much lower for vertical scanning, the vertical scanner 220 is typically not resonant. The mirror 222 receives light from the horizontal scanner 201 and produces vertical deflection at about 30–100 Hz. Advantageously, the lower frequency allows the mirror 222 to be significantly larger than the mirror 202, thereby reducing constraints on the positioning of the vertical scanner 220.

In operation, the light source 74, driven by the image source 56 (FIG. 8) outputs a beam of light that is modulated according to the image signal. At the same time, the drive electronics 218 activate the coils 206, 208, 224, 226 to oscillate the mirrors 202, 222. The modulated beam of light strikes the oscillating horizontal mirror 202, and is deflected horizontally by an angle corresponding to the instantaneous angle of the mirror 202. The deflected light then strikes the vertical mirror 222 and is deflected at a vertical angle corresponding to the instantaneous angle of the vertical mirror 222. The modulation of the optical beam is synchronized with the horizontal and vertical scans so that at each position of the mirrors, the beam color and intensity correspond to a desired virtual image. The beam therefore "draws" the virtual image directly upon the user's retina. One skilled in the art will recognize that several components of the scanner 200 have been omitted for clarity of presentation. For example, the vertical and horizontal scanners 201, 220 are typically mounted in fixed relative positions to a frame. Additionally, the scanner 200 typically includes one or more turning mirrors that direct the beam such that the beam strikes each of the mirrors a plurality of times to increase the angular range of scanning.

Figure 11:
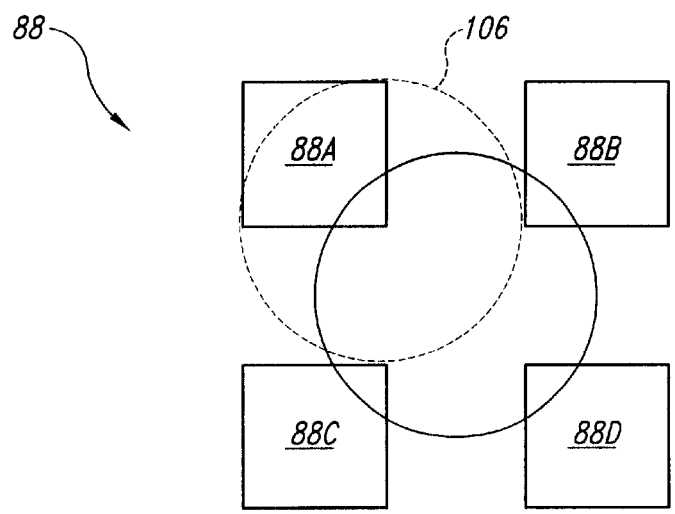
FIG. 11 is a top plan view of a position detector including four separate optical detectors.

FIG. 11 shows one realization of the position detector 88 in which the CCD array is replaced with four detectors 88A–88D each aligned to a respective quadrant of the virtual image. When the user's eye 52 becomes misaligned with the virtual image, the pupil shadow 106 shifts, as represented by the broken lines in FIG. 10. In this position, the intensity of light received by one or more of the detectors 88A–88D falls. The voltage on the positioners 116, 118 can then be varied to realign the scanned light to the user's eye 52. Advantageously, in this embodiment, the outputs of the four quadrant detector can form error signals that, when amplified appropriately, may drive the respective positioners 114, 116 to reposition the light emitter 74.

A further aspect of the embodiment of the display 70 of FIG. 8 is z-axis adjustment provided by a third positioner 128 that controls the position of the light source 74 and scanner 76 along a third axis. The third positioner 128, like the X and Y positioners 114, 116 is a piezoelectric positioner controlled by the electronic controller 108 through a corresponding driver 130.

As can be seen from FIG. 8, when the user's eye 52 rotates to view an object off-axis and the X and Y positioners 116, 118 adjust the position of the light source 74, the distance between the scanner 76 and the first mirror 64 changes slightly, as does the distance between the first mirror 64 and the eye 52. Consequently, the image plane defined by the scanned beam may shift away from the desired location and the perceived image may become distorted. Such shifting may also produce an effective astigmatism in biocular or binocular systems due to difference in the variations between the left and right eye subsystems. To compensate for the shift in relative positions, the controller 108, responsive to positioning data from the memory 110, activates the third positioner 130, thereby adjusting the z-axis position of the light source 74. The appropriate positioning data can be determined empirically or may be developed analytically through optical modeling.

One skilled in the art will also recognize that the controller 108 can also adjust focus of the scanned beam 53 through the third positioner 130. Adjustment of the focus allows the controller to compensate for shifts in the relative positions of the scanning assembly 76, mirrors 62, 64 and eye 52 which may result from movement of the eye, temperature changes, pressure changes, or other effects. Also, the controller 108 can adjust the z-axis position to adapt a head-mounted display to different users.

Although the embodiments herein are described as having positioning along three orthogonal axes, the invention is not so limited. First, physical positioning may be applied to other degrees of motion. For example, rotational positioners may rotate the mirrors 62, 64, the light source 74 or the substitute 85 about various axes to provide rotational positioning control. Such an embodiment allows the controller log to establish position of the virtual image (e.g. the region 42 of FIG. 1). By controlling the position of the virtual image, the controller 108 can move the region 42 to track changes in the user's field of view. The region 42 can thus remain in a substantially fixed position in the user's field of view. In addition to rotational freedom, one skilled in the art will recognize that the three axes are not limited to orthogonal axes.

Figure 12A:
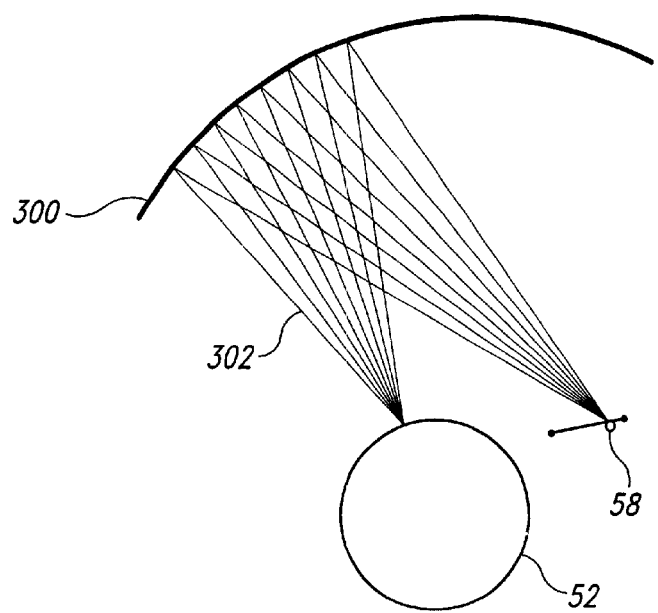
FIGS. 12A–C are diagrammatic representations of a display utilizing a single reflective optic and a moving optical source.
Figure 12B:
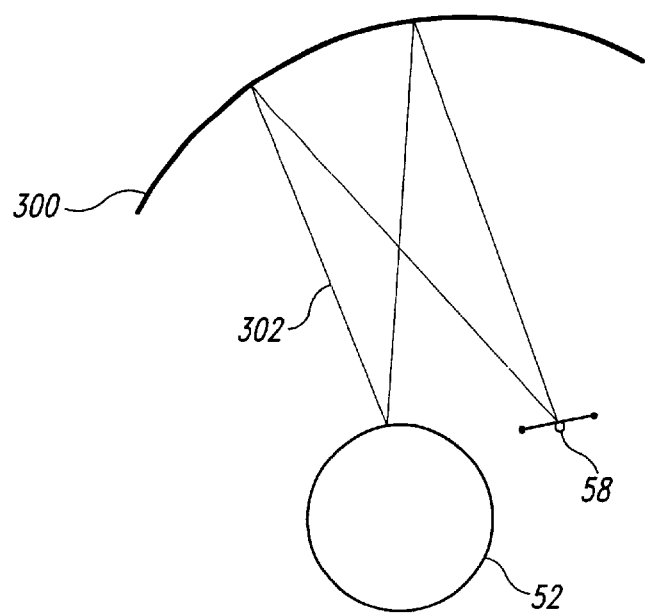
Figure 12C:
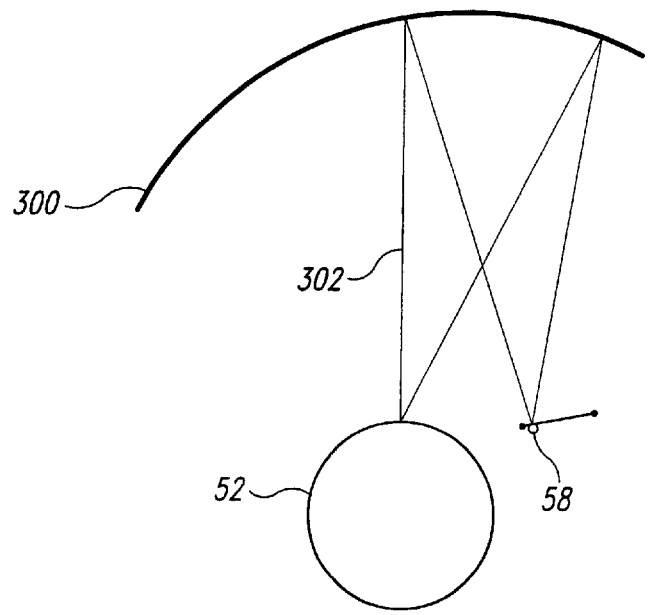

While the embodiments described herein have included two mirrors 62, 64, one skilled in the art will recognize that more complex or less complex optical structures may be desirable for some applications. For example, as shown in FIGS. 12A–C, a single reflective optics 300 can be used to reflect light toward the viewer's eye 52. By tracing the optical paths 302 from the scanning assembly 58 to the pupil 65, the corresponding position and angular orientation of the scanning assembly 58 can be determined for each eye position, as shown in FIGS. 12A–C.

The determined position and orientation are then stored digitally and retrieved in response to detected eye position. The scanning assembly 58 is then moved to the retrieved eye position and orientation. For example, as shown in FIG. 12B, when the field of view of the eyes is centered, the scanning assembly 58 is centered. When the field of view is shifted left, as shown in FIG. 12A, the scanning assembly 58 is shifted right to compensate.

Figure 13:
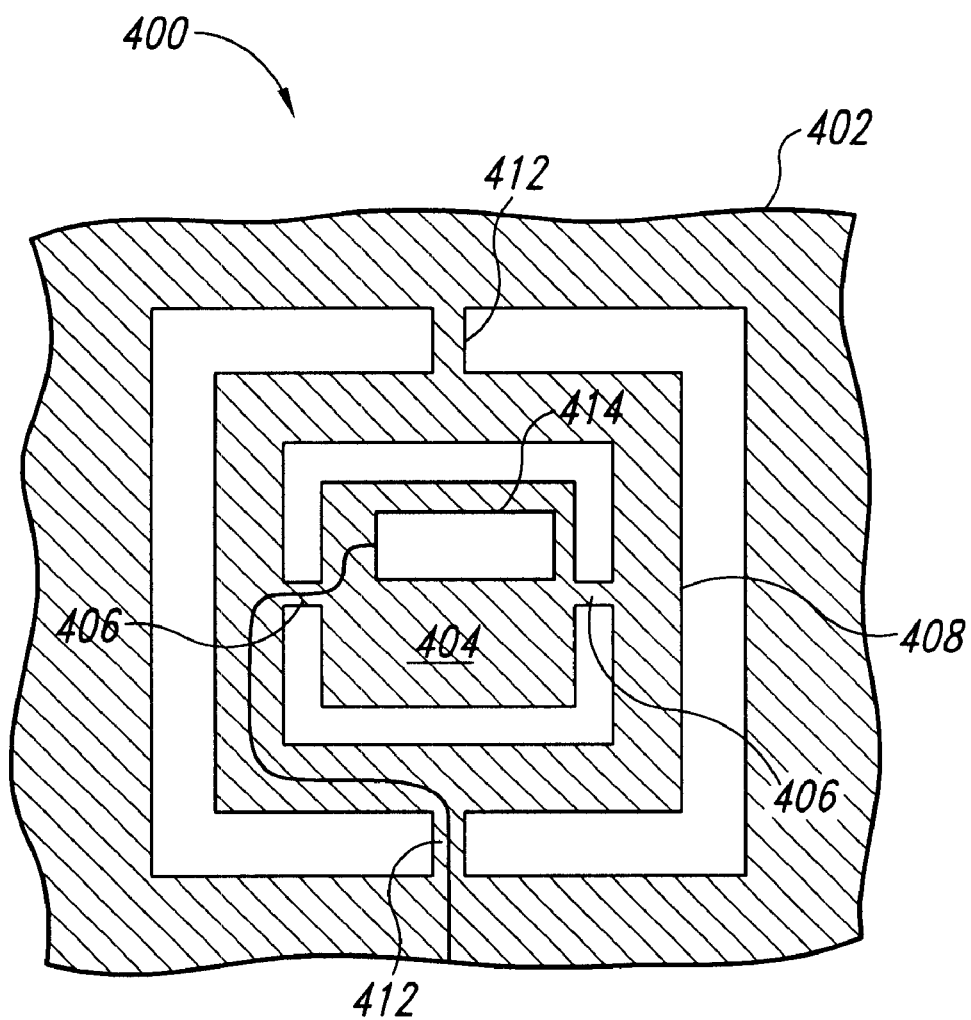
FIG. 13 is a top plan view of a bi-axial MEMS scanner for use in the display of FIG. 2.

To reduce the size and weight to be moved in response to the detected eye position, it is desirable to reduce the size and weight of the scanning assembly 58. One approach to reducing the size and weight is to replace the mechanical resonant scanners 200, 220 with a microelectromechanical (MEMS) scanner, such as that described in U.S. Pat. No. 5,629,790 entitled MICROMACHINED TORSIONAL SCANNER to Neukermans et. al. and U.S. Pat. No. 5,648,618 entitled MICROMACHINED HINGE HAVING AN INTEGRAL TORSION SENSOR to Neukermans et. al., each of which is incorporated herein by reference. As described therein and shown in FIG. 13, a bi-axial scanner 400 is formed in a silicon substrate 402. The bi-axial scanner 400 includes a mirror 404 supported by opposed flexures 406 that link the mirror 404 to a pivotable support 408. The flexures 406 are dimensioned to twist torsionally thereby allowing the mirror 404 to pivot about an axis defined by the flexures 406, relative to the support 408. In one embodiment, pivoting of the mirror 404 defines horizontal scans of the scanner 400.

A second pair of opposed flexures 412 couple the support 408 to the substrate 402. The flexures 412 are dimensioned to flex torsionally, thereby allowing the support 408 to pivot relative to the substrate 402. Preferably, the mass and dimensions of the mirror 404, support 408 and flexures 406, 412 are selected such that the mirror 404 resonates, at 10–40 kHz horizontally with a high Q and such that the support 408 pivots at frequencies that are preferably higher than 60 Hz, although in some applications, a lower frequency may be desirable. For example, where a plurality of beams are used, vertical frequencies of 10 Hz or lower may be acceptable.

In a preferred embodiment, the mirror 404 is pivoted by applying an electric field between a plate 414 on the mirror 404 and a conductor on a base (not shown). This approach is termed capacitive drive, because of the plate 414 acts as one plate of a capacitor and the conductor in the base acts as a second plate. As the voltage between plates increases, the electric field exerts a force on the mirror 404 causing the mirror 404 to pivot about the flexures 406. By periodically varying the voltage applied to the plates, the mirror 404 can be made to scan periodically. Preferably, the voltage is varied at the mechanically resonant frequency of the mirror 404 so that the mirror 404 will oscillate with little power consumption.

The support 408 may be pivoted magnetically or capacitively depending upon the requirements of a particular application. Preferably, the support 408 and flexures 412 are dimensioned so that the support 408 can respond frequencies well above a desired refresh rate, such as 60 Hz.

Figure 14:
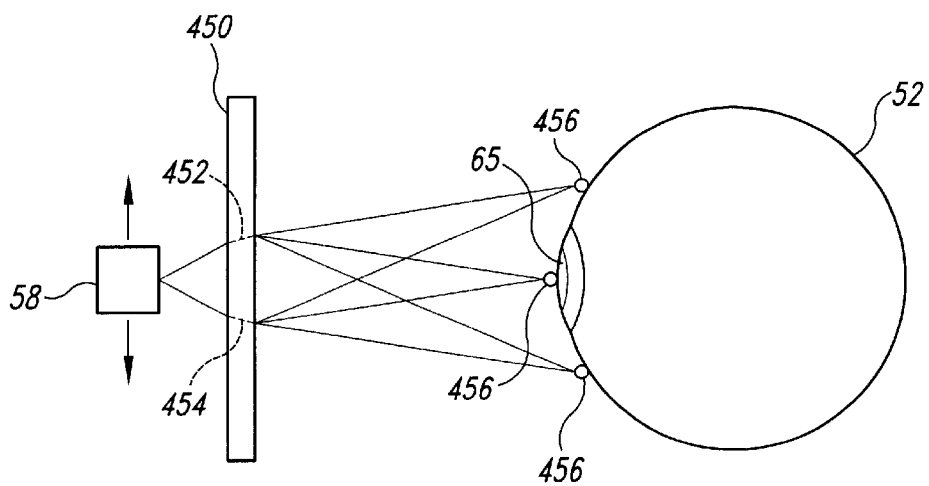
FIG. 14 is a diagram of an alternative embodiment of a display including an exit pupil expander and a moving light emitter.
Figure 15A:
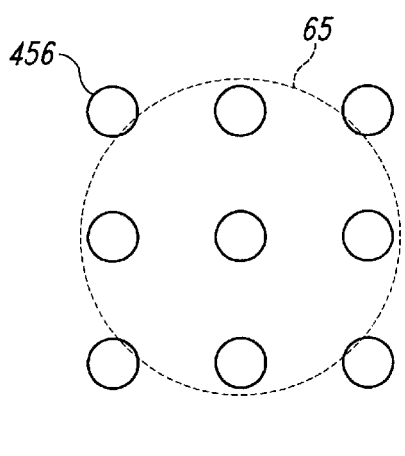
FIG. 15A is a diagrammatic representative of nine exit pupils centered over an eye pupil.

An alternative embodiment according to the invention, shown in FIG. 14 includes a diffractive exit pupil expander 450 positioned between the scanning assembly 58 and the eye 52. As described in U.S. Pat. No. 5,701,132 entitled VIRTUAL RETINAL DISPLAY WITH EXPANDED EXIT PUPIL to Kollin et. al. which is incorporated herein by reference, at each scan position 452, 454 the exit pupil expander 450 redirects the scanned beam to a plurality of common locations, to define a plurality of exit pupils 456. For example, as shown in FIG. 15A, the exit pupil expander 450 may produce nine separate exit pupils 456. When the user's pupil 65 receives one or more of the defined exit pupils 456, the user can view the desired image.

Figure 15B:
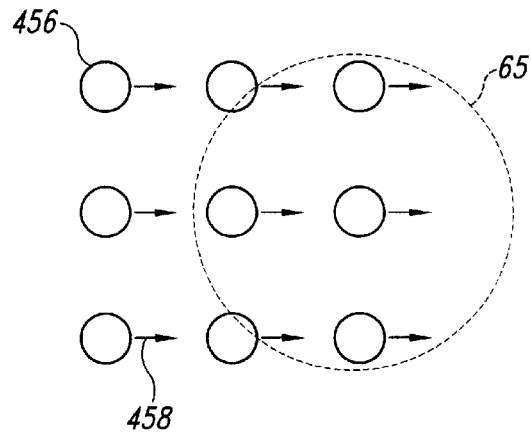
FIG. 15B is a diagrammatic representation of shifting of the eye pupil of FIG. 15A and corresponding shifting of the exit pupil array.

If the user's eye moves, as shown in FIG. 15B, the pupil 65 still may receive light from one or more of the exit pupils 456. The user thus continues to perceive the image, even when the pupil 65 shifts relative to the exit pupils 456. Nevertheless, the scanning assembly 58 (FIGS. 12A–12C) shifts, as indicated by the arrows 458 in FIG. 14 and arrows 460 in FIG. 15B to center the array of exit pupils 456 with the user's pupil 65. By re-centering the array relative to the pupil 65, the number of exit pupils 456 can be reduced while preserving coupling to the pupil 65.

Although the invention has been described herein by way of exemplary embodiments, variations in the structures and methods described herein may be made without departing from the spirit and scope of the invention. For example, the positioning of the various components may also be varied. In one example of repositioning, the detector 88 and infrared source 92 may be mounted separately from the light source 74. In such an embodiment, the detector 98 and infrared source 92 may be mounted in a fixed location or may be driven by a separate set of positioners. Also, in some applications, it may be desirable to eliminate the infrared source 92. In such an embodiment, the detector 98 would monitor reflected visible light originating from the light source 74. Also, the infrared beam and scanned light beam may be made collinear through the use of conventional beam splitting techniques. In still another embodiment, the piezoelectric positioners 116, 118 may be coupled to the mirror 64 or to an intermediate lens 121 to produce a "virtual" movement of the light source 74. In this embodiment, translation of the mirror 64 or lens 121 will produce a shift in the apparent position of the light source 74 relative to the eye.

By shifting the position or effective focal length of the lens 121, the lens 121 also allows the display to vary the apparent distance from the scanner 200, 400 to the eye 52. For example, the lens 121 may be formed from or include an electro-optic material, such as quartz. The effective focal length can then be varied by varying the voltage across the electro-optic material for each position of the scanner 200, 400. Moreover, although the horizontal scanners 200, 400 are described herein as preferably being mechanically resonant at the scanning frequency, in some applications the scanner 200 may be non-resonant. For example, where the scanner 200 is used for "stroke" or "calligraphic" scanning, a non-resonant scanner would be preferred. One skilled in the art will recognize that, although a single light source is described herein, the principles and structures described herein are applicable to displays having a plurality of light sources. In fact, the exit pupil expander 450 of FIG. 14 effectively approximates the use of several light sources. Further, although the exemplary embodiment herein utilizes the pupil shadow to track gaze, a variety of other approaches may be within the scope of the invention, for example, reflective techniques, such known "glint" techniques as may be adapted for use with the described embodiments according to the invention may image the fundus or features of the iris to track gaze. Accordingly, the invention is not limited except as by the appended claims.

What is claimed is:

1. A method of producing an image for viewing by an eye in an image field with a portable head mounted display, comprising the steps of:

emitting light from a first location, modulating the light in a pattern corresponding to the image;

scanning the light through a periodic scan pattern in two axes;

wherein emitting light includes modifying the periodic scan pattern with guiding optics to produce a visible image at the image field;

producing a positioning beam;

directing the positioning beam along a first path toward the eye;

receiving a portion of light reflected from the eye with an optical detector;

producing an electrical signal responsive to the received reflected light;

identifying a pupil position responsive to the electrical signal; and physically repositioning the first location angularly about a first axis in response to the electrical signal, wherein the angular repositioning of the first location about the first axis corresponds substantially to alignment of the periodic scan pattern with the identified pupil position;

determining an optical path length change corresponding to a change in optical path lengths produced by angular movement of the scanner or movement of the pupil relative to the scanner, the optical path extending from the scanner to the pupil; and repositioning the first location to a revised location along a second optical axis relative to the optical element a distance corresponding to the determined optical path length change, the revised location establishing the image field at the pupil location while the guiding optics remains substantially stationary relative to the eye.

2. The method of claim 1 wherein an image source produces the light and wherein the step of physically repositioning the first location in response to the electrical signal includes physically repositioning the image source relative to the user's eye.

3. The method of claim 2 wherein the step of physically repositioning the image source includes activating a piezoelectric positioner coupled to the image source.

4. The method of claim 2 wherein the step of physically repositioning the image shown includes activating a shape memory alloy coupled to the image source.

5. The method of claim 1 wherein the optical detector includes a detector array and wherein the step of producing an electrical signal responsive to the received reflected light includes outputting data from the detector array.

6. The method of claim 1 wherein the positioning beam is an infrared beam.

7. The method of claim 1 wherein the step of producing an electrical signal includes the steps of:
   outputting data from the detector array;
   retrieving data stored in a memory; and
   producing the electrical signal in response to the retrieved data.

8. The method of claim 1 wherein a portion of the emitted light forms the positioning beam.

9. The method of claim 1 wherein the guiding optics include a lens.

10. The method of claim 9 wherein the guiding optics further include a turning reflector.

* * * * *